United States Patent
Lam et al.

(10) Patent No.: US 10,780,922 B2
(45) Date of Patent: Sep. 22, 2020

(54) LONGITUDINAL MEMBER FOR A HEAVY GOODS VEHICLE

(71) Applicant: ARCELORMITTAL, Luxembourg (LU)

(72) Inventors: Jimmy Lam, Noisy le Grand (FR); Nicolas Schneider, Saint-Martin Longeau (FR)

(73) Assignee: ARCELORMITTAL, Luxembourg (LU)

( * ) Notice: Subject to any disclaimer, the term of this patent is extended or adjusted under 35 U.S.C. 154(b) by 95 days.

(21) Appl. No.: 16/306,653

(22) PCT Filed: Jun. 2, 2017

(86) PCT No.: PCT/IB2017/053275
§ 371 (c)(1),
(2) Date: Dec. 3, 2018

(87) PCT Pub. No.: WO2017/208201
PCT Pub. Date: Dec. 7, 2017

(65) Prior Publication Data
US 2019/0300058 A1 Oct. 3, 2019

(30) Foreign Application Priority Data
Jun. 2, 2017 (WO) .................. PCT/IB2017/063275

(51) Int. Cl.
*B62D 21/15* (2006.01)
*B21D 22/02* (2006.01)
(Continued)

(52) U.S. Cl.
CPC ......... *B62D 21/155* (2013.01); *B21D 22/022* (2013.01); *B23K 26/24* (2013.01);
(Continued)

(58) Field of Classification Search
CPC .... B62D 21/155; B62D 21/152; B62D 21/15; B62D 29/007; B62D 33/0633; B62D 33/067; B21D 22/022
See application file for complete search history.

(56) References Cited

U.S. PATENT DOCUMENTS

| 3,312,303 A | 4/1967 | Milloy |
| 8,100,462 B2 * | 1/2012 | Minami ................. B62D 33/06 296/187.08 |

(Continued)

FOREIGN PATENT DOCUMENTS

| DE | 10261929 A1 * | 7/2004 | ......... B62D 33/0604 |
| DE | 102004059947 A1 | 4/2006 | |

(Continued)

*Primary Examiner* — Hilary L Gutman
(74) *Attorney, Agent, or Firm* — Davidson, Davidson & Kappel, LLC

(57) ABSTRACT

A longitudinal member is provided. The longitudinal member includes a front end provided with a hinge element for attaching the longitudinal member in an articulated manner to a heavy goods vehicle body, and a rear end including an attachment element for attaching the longitudinal member in a non-permanent manner to the heavy goods vehicle body. The longitudinal member includes a front part extending from the front end to an intermediate area of the longitudinal member and a rear part extending from the intermediate area to the rear end of the longitudinal member. The product ($P_F$) of the wall thickness ($t_F$) of the front part by the yield strength ($Ys_F$) of the material of the front part is greater than the product ($P_R$) of the wall thickness ($t_R$) of the rear part by the yield strength ($Ys_R$) of the material of the rear part.

22 Claims, 3 Drawing Sheets

(51) Int. Cl.
  *B23K 26/24* (2014.01)
  *B62D 29/00* (2006.01)
  *B62D 33/063* (2006.01)
  *B62D 33/067* (2006.01)
  *C22C 38/00* (2006.01)
  *C22C 38/02* (2006.01)
  *C22C 38/04* (2006.01)
  *C22C 38/06* (2006.01)
  *C22C 38/48* (2006.01)
  *C22C 38/50* (2006.01)
  *C22C 38/54* (2006.01)

(52) U.S. Cl.
  CPC ......... *B62D 21/152* (2013.01); *B62D 21/157* (2013.01); *B62D 29/007* (2013.01); *B62D 33/067* (2013.01); *B62D 33/0633* (2013.01); *C22C 38/001* (2013.01); *C22C 38/002* (2013.01); *C22C 38/02* (2013.01); *C22C 38/04* (2013.01); *C22C 38/06* (2013.01); *C22C 38/48* (2013.01); *C22C 38/50* (2013.01); *C22C 38/54* (2013.01)

(56) References Cited

U.S. PATENT DOCUMENTS

2010/0320803 A1   12/2010   Ishigami et al.
2015/0175208 A1    6/2015   Kuwayama et al.
2016/0129941 A1    5/2016   Kim

FOREIGN PATENT DOCUMENTS

| | | | | |
|---|---|---|---|---|
| DE | 102013001999 A1 | | 8/2014 | |
| JP | H08230724 A | | 9/1996 | |
| JP | 10278845 A | * | 10/1998 | ............. B62D 21/15 |
| JP | 11235987 A | * | 8/1999 | ........... B62D 21/152 |
| JP | 2017114445 A | * | 6/2017 | ........... B62D 33/067 |
| RU | 130943 U1 | | 8/2013 | |
| WO | WO-0018633 A1 | * | 4/2000 | ......... B62D 33/0636 |
| WO | WO-2005102825 A1 | * | 11/2005 | ............. B62D 33/06 |
| WO | WO-2006035477 A1 | * | 4/2006 | ........... B62D 33/067 |

\* cited by examiner

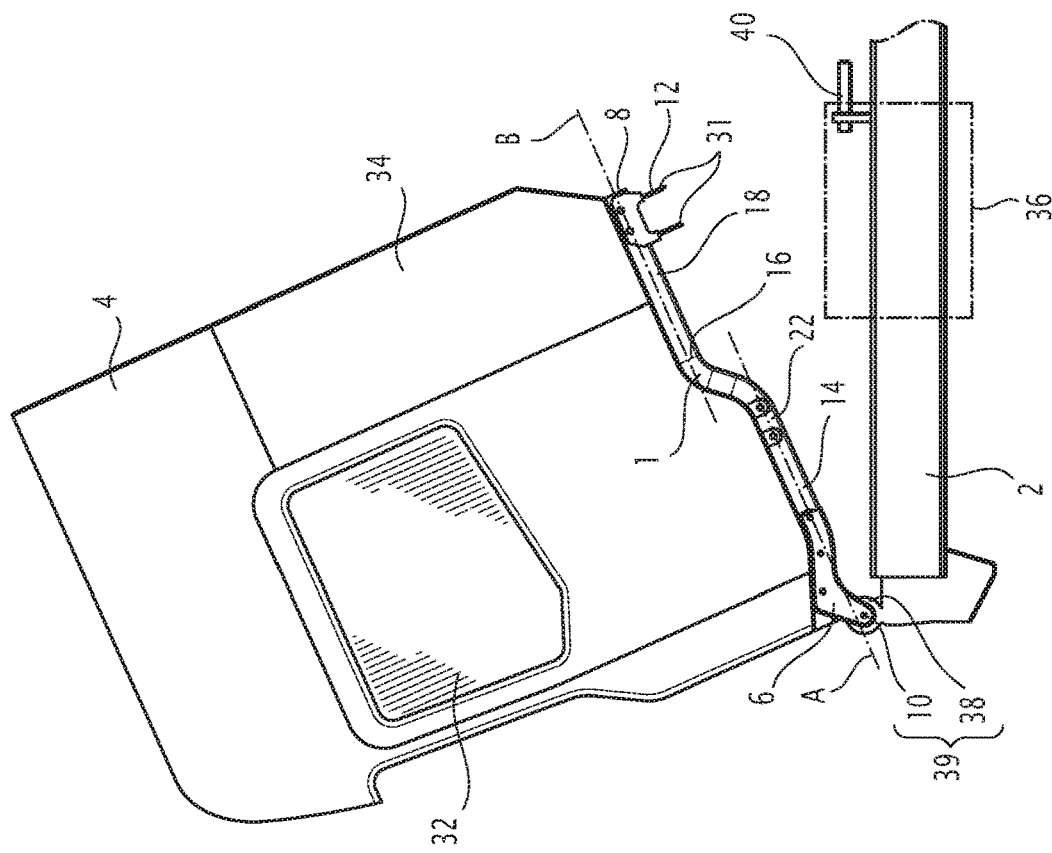
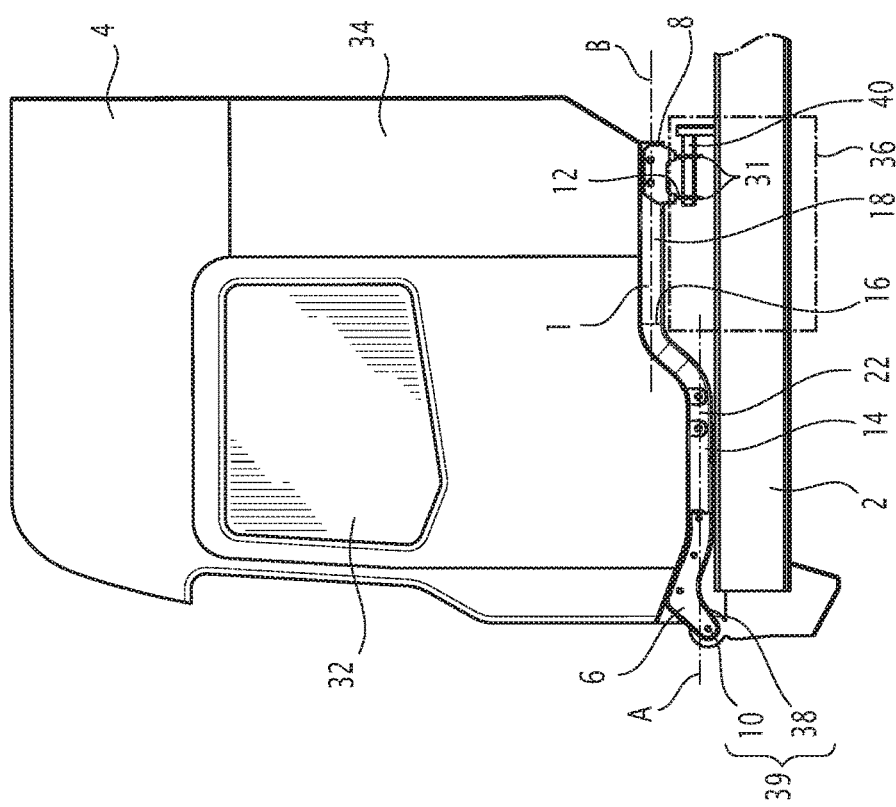

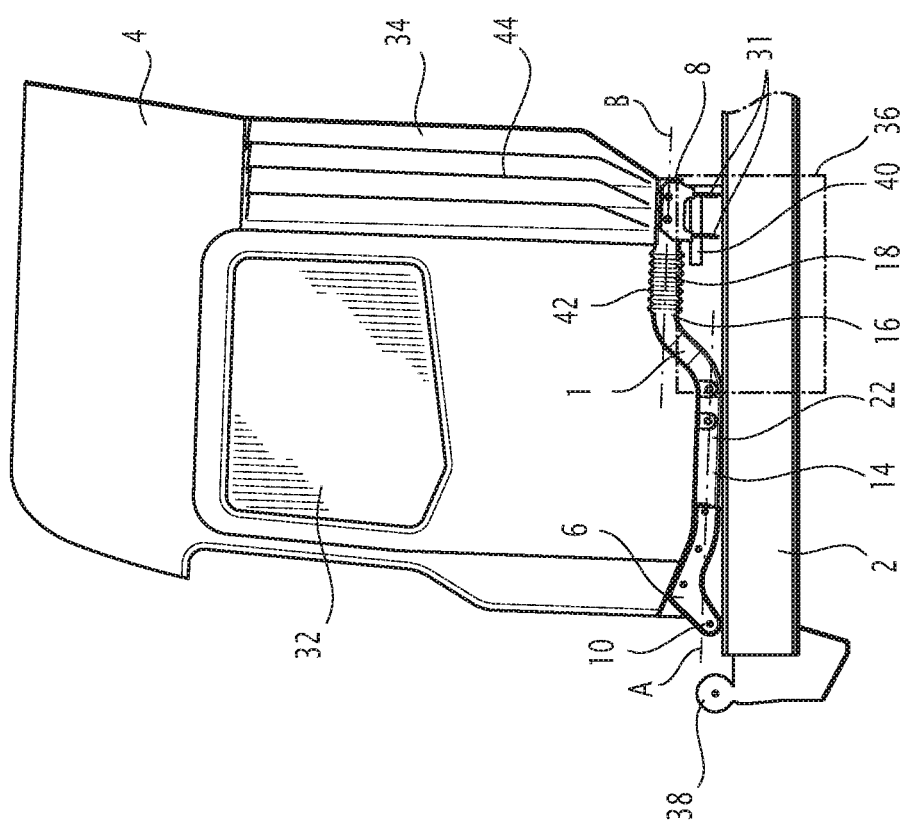

LONGITUDINAL MEMBER FOR A HEAVY GOODS VEHICLE

The present invention relates to a longitudinal member for a heavy goods vehicle structure and to a method for producing such a longitudinal member.

BACKGROUND

In conventional automotive vehicle, longitudinal members, also known as longitudinal rails, are arranged to protect the vehicle compartment and its passengers in case of an impact by absorbing a part of the energy of said impact and by preventing deformation of the floor structure of the vehicle compartment under which the longitudinal member extends.

To this end, the longitudinal member can comprise a deformable part, extending from the end of the longitudinal member against which the impact occurs and arranged to be crushed, or to buckle, along its axis to absorb energy, and a undeformable part, extending from the end of the front part opposite the end against which the impact occurs and arranged to remain undeformed under the influence of the impact. In case of a front impact, the deformable part is arranged in front of the vehicle compartment and extends for example in the space arranged to receive the motor of the vehicle while the undeformable part extends under the vehicle compartment to prevent deformation of the floor structure. In case of a rear impact, the deformable part extends at the rear of the vehicle compartment, for example under the storage space of the vehicle, and the undeformable part extends under the vehicle compartment. In other words, the longitudinal member is arranged such that the impact is applied on the deformable part, while the undeformable part extends away from the point of impact.

This arrangement is favorable because the automotive vehicle comprises spaces in front and at the rear of the vehicle compartment, which can be used to absorb energy by deformation of the longitudinal member without causing deformation of the vehicle compartment, which could injure the passengers of the vehicle.

Such a behavior of the longitudinal member can be obtained by forming the deformable part with a ductile material and the undeformable part with a high strength part.

However, such an arrangement is not appropriate for front impacts against a heavy goods vehicle, or truck, wherein the vehicle compartment extends at the front of the vehicle. Indeed, in this case, providing a deformable part arranged such that the impact is applied against the deformable part would lead to a crushing of the vehicle compartment, where the driver and possible passengers are seated, during the impact. Consequently, the above-described longitudinal member would be dangerous for the occupants of the vehicle if it was arranged in a heavy goods vehicle.

In view of this problem, longitudinal members in a heavy goods vehicle are generally arranged to have a more continuous behavior wherein the energy absorption is evenly distributed over the whole length of the longitudinal member. In other words, the whole longitudinal member is deformed in case of an impact such that the deformation of the space where the occupants are seated is reduced.

However, such a solution is still not satisfactory since the space where the occupants are seated still gets deformed in case of a front impact, which can cause injuries to the occupants.

SUMMARY OF THE INVENTION

An object of the present invention is to overcome the above-drawbacks by proposing a longitudinal member for heavy goods vehicle having a satisfactory behavior in case of an impact.

The present invention provides a longitudinal member, wherein the product of the wall thickness of the front part by the yield strength of the material of the front part is greater than the product of the wall thickness of the rear part by the yield strength of the material of the rear part. The longitudinal member according the invention therefore allows energy absorption of an impact by deformation of the rear part of the longitudinal member, i.e. away from the point of impact and away from the space where the occupants of the vehicle are seated, while said space remains protected by the front part of the longitudinal member which is substantially not deformed during the impact. More particularly, the rear part of the longitudinal member is for example arranged under the rear space of the vehicle compartment which is generally a storage space and which is not intended to accept passengers when the vehicle is moving. Consequently, the longitudinal member improves the protection of the occupants of the vehicle in case of an impact against the vehicle compartment.

Particular features of the longitudinal member may include one or more of the following features:
- the wall thickness of the front part is comprised between 0.6 mm and 3 mm and the yield strength of the material of the front part is comprised between 960 MPa and 1550 MPa;
- the wall thickness of the rear part is comprised between 0.6 mm and 3 mm and the yield strength of the material of the rear part is comprised between 350 MPa and 950 MPa;
- the wall thickness of the front part is greater than the wall thickness of the rear part;
- the longitudinal member is a press hardened member;
- the front part is made of a press hardened steel comprising in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration; or $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, a remainder being iron and unavoidable impurities resulting from elaboration;
- the rear part is made of a press hardened steel comprising in % weight: $0.04\% \leq C \leq 0.1\%$, $0.3\% \leq Mn \leq 2\%$, $Si \leq 0.3\%$, $Ti \leq 0.08\%$, $0.015\% \leq Nb \leq 0.1\%$, $Al \leq 0.1\%$, $S \leq 0.05\%$, $P \leq 0.1\%$, Cu, Ni, Cr, Mo, less than 0.1%, a remainder being iron and unavoidable impurities resulting from elaboration;
- the rear part has a bending angle greater than 75°;
- a fraction of martensite in a microstructure of the front part is greater than a fraction of martensite in a microstructure of the rear part;
- the front part and the rear part are coated with a zinc-based coating, or with an aluminum-based coating;

the intermediate area extends at an end of an elbow shaped part of the first part such that the front part, outside the elbow shaped area, extends mainly along a first longitudinal axis and the rear part extends mainly along a second longitudinal axis, the first longitudinal axis and the second longitudinal axis being different and substantially parallel to each other; and the longitudinal member is intended to extend under a vehicle compartment floor structure of the heavy goods vehicle.

The invention further provides a heavy goods vehicle structure comprising a heavy goods vehicle body and a heavy goods vehicle compartment attached to said vehicle body by at least one longitudinal member.

Particular features of the heavy goods vehicle structure may include on or more of the following features:

the hinge is arranged to break in case of an impact applied in a substantially longitudinal direction against the front end of the longitudinal member under an external load greater than 80 kN, while the locking attachment is arranged to resist to said impact when the attachment element is attached to the locking element such that the rear part of the longitudinal member can be crushed to absorb energy in case of said impact;

the longitudinal member extends under a vehicle compartment floor structure of the heavy goods vehicle structure; and the vehicle compartment is attached to the vehicle body by at least two longitudinal members extending on either sides of the vehicle compartment floor structure.

The invention also provides a method for producing a longitudinal member as described above, comprising the steps of:

providing a front part blank and a rear part blank, joining the front part blank to the rear part blank to obtain a member blank; and hot press forming the member blank into the longitudinal member shape, said longitudinal member comprising a front part and a rear part, such that the product of the wall thickness of the front part by the yield strength of the material of the front part is greater than the product of the wall thickness of the rear part by the yield strength of the material of the rear part.

Particular features of the method may include one or more of the following features:

the member blank is hot press formed into a shape having a U-shaped cross-section;

the member blank is shaped to comprise an elbow shaped part;

the front part blank is joined to the rear part blank by welding without superposing the front part blank and the rear part blank;

the welding is laser welding;

a further step of attaching a hinge element to the front end of the longitudinal member and a step of attaching an attachment element to the rear end of the longitudinal member.

BRIEF DESCRIPTION OF THE DRAWINGS

Other aspects and advantages of the invention will appear upon reading the following description, given by way of example and made in reference to the appended drawings, wherein:

FIG. 2 is a side view of a heavy goods vehicle structure according to the invention in normal use of the heavy goods vehicle, FIG. 3 is a side view of the heavy goods vehicle structure of FIG. 2, wherein the vehicle compartment is in a tilted position relative to the vehicle body, and FIG. 4 is a side view of the heavy goods vehicle structure of FIG. 2 after an impact.

DETAILED DESCRIPTION

Figure 1:
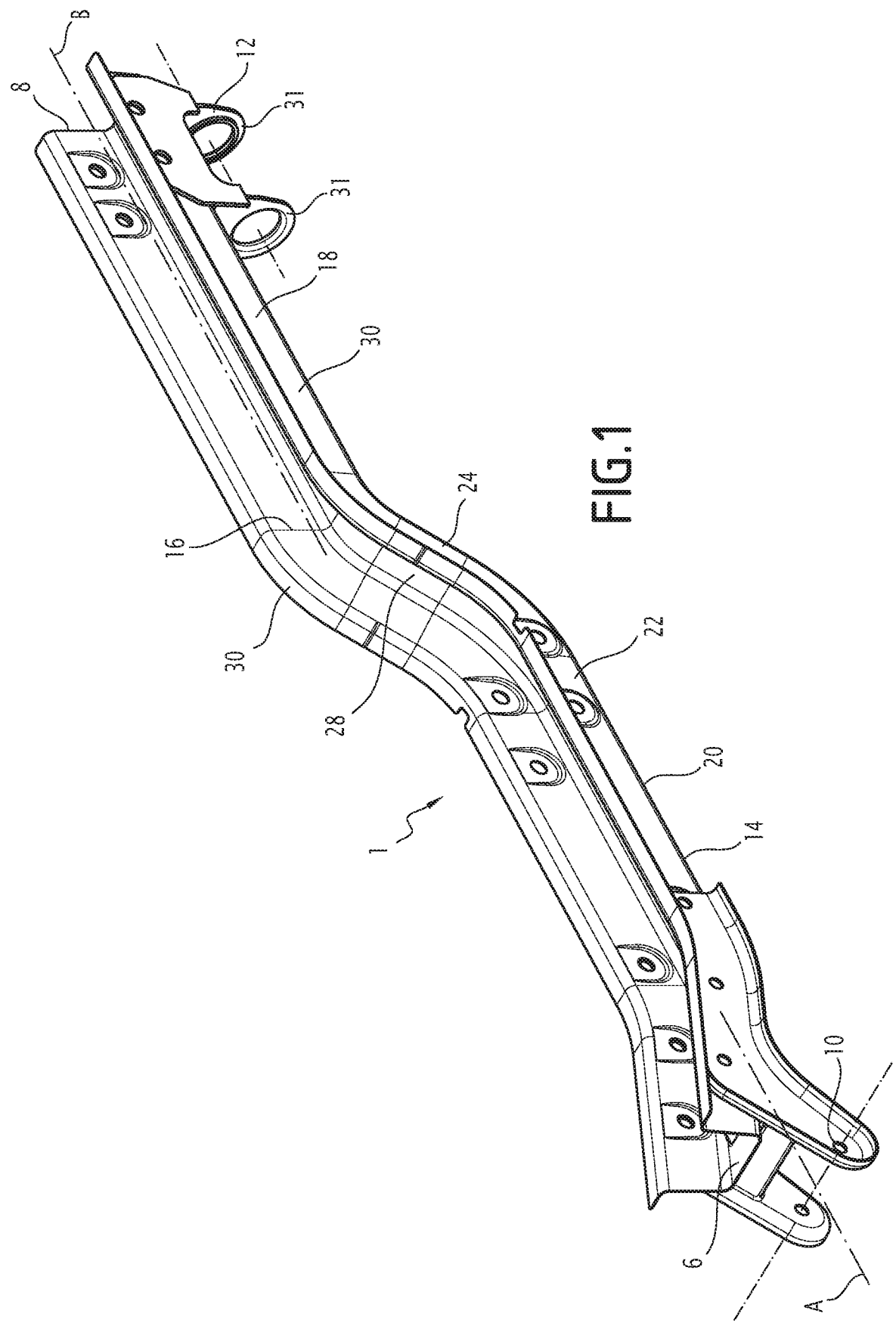
FIG. 1 is a perspective view of a longitudinal member according to the invention.

In the following description, the terms "rear" and "front" are defined according the usual directions of a mounted vehicle. The term "longitudinal" is defined according to the rear-front direction of the vehicle.

In reference to FIG. 1, a longitudinal member 1, or longitudinal rail, for a heavy goods vehicle will be described. Such a heavy goods vehicle, also known as a truck or a lorry, is a vehicle having a weight of 3.5 tons or more. The structure of such a heavy goods vehicle comprises a vehicle body 2, carrying the wheels and, for example, means for attaching a lorry trailer, and a vehicle compartment 4 attached to the vehicle body 2 by one or more longitudinal members 1 as will be described in greater detail subsequently.

The longitudinal member 1 extends in a longitudinal direction between a front end 6 and a rear end 8 when the longitudinal member 1 is installed in a vehicle. The front end 6 is provided with a hinge element 10 arranged for attaching the longitudinal member 1 to the vehicle body 2 in a hinged manner as will be described subsequently. The rear end 8 is provided with an attachment element 12 arranged for attaching the longitudinal member 1 to the vehicle body 2 in a non-permanent manner, as will be described subsequently.

The longitudinal member comprises a front part 14 extending between the front end 6 and an intermediate area 16 of the longitudinal member 1 and a rear part 18 extending between the intermediate area 16 and the rear end 8. Consequently, the front part 14 and the rear part 18 are adjacent to each other and are separated by the intermediate area 16.

According to the embodiment shown in FIG. 1, the front part 16 comprises a first part 20 extending along a first longitudinal axis A between the front end 6 and an opposite end 22 and a second part 24 having an elbow shape extending from the opposite end 22 to the intermediate area 16. This means that the first part 14 extends mainly along the first longitudinal axis A outside the elbow shaped second part 24 of the first part 14. The rear part 18 extends along a second longitudinal axis B, different from and parallel to the first longitudinal axis A, from the intermediate area 16 to the rear end 8. The elbow shape of the second part 24 joins the first part 20 of the front part 14 to the rear part 18 and comprises an inclined portion inclined between the first longitudinal axis A and the second longitudinal axis B and extending between the opposite end 22 and the intermediate area 16. This shape of the longitudinal member is given by way of example and the longitudinal member 1 could have another shape, for example a straight shape wherein the first and second longitudinal axes are coincident.

According to the embodiment shown in FIG. 1, the longitudinal member 1 has a U-shaped cross-section in a plane perpendicular to the first and second longitudinal axes A and B. Consequently, the longitudinal member 1 comprises a bottom 28 and two branches 30 extending perpendicularly to and on either sides of the bottom 28. The U is opened towards the vehicle compartment 4, meaning that the branches 30 extend between the bottom 28 and the vehicle compartment 4.

In a same plane perpendicular to the first and second longitudinal axes A and B, the wall thickness of the bottom 28 is equal to the wall thickness of the branches 30, while said thickness can vary along the longitudinal direction.

The length of the front part 14, measured along the longitudinal direction, is greater than the length of the rear part 18, measured along the longitudinal direction. More particularly, the length of the front part 14 is substantially equal to the length of the space arranged to receive the occupants in the vehicle compartment 4 and the length of the rear part 18 is proportional to the quantity of energy to be absorbed by the rear part 18 in case of an impact, as will be described subsequently. For example, the length of the front part 14 is comprised between 80 cm and 130 cm and the length of the rear part 18 is comprised between 30 cm and 60 cm.

The front part 14 and the rear part 18 are arranged such that the product $P_F$ of the wall thickness $t_F$ of front part 14 by the yield strength $Ys_F$ of the material of the front part 14 is greater than the product $P_R$ of the wall thickness $t_R$ of the rear part 18 by the yield strength $Ys_R$ of the rear part 18. In other words, the front part 14 and the rear part 18 are arranged in order to comply with the following formulas: $P_F = t_F * Ys_F$, $P_R = t_R * Ys_R$ and $P_F > P_R$.

This means that the load corresponding to the onset of plasticity of the rear part 18 is inferior to the load corresponding to the onset of plasticity of the front part 14. In other words, the rear part 18 forms a deformable part when a load higher than a given threshold is applied to the longitudinal member 1 while the front part 14 remains undeformed when said load is applied to the longitudinal member 1. This behavior of the longitudinal member 1 is satisfactory in case of an impact against the front of a heavy goods vehicle, as will be described subsequently.

The wall thickness $t_F$ of the front part 14 is for example substantially comprised between 0.6 mm and 3 mm. The yield strength $Ys_F$ of the material of the front part 14 is for example substantially comprised between 960 MPa and 1550 MPa. The wall thickness $t_F$ and the yield strength $Ys_F$ of the front part 14 are for example constant over the entire length of the front part measured along a longitudinal direction. In another embodiment, the wall thickness $t_F$ and the yield strength $Ys_F$ of the front part 14 vary over the entire length of the front part measured along a longitudinal direction. In this case, the lowest wall thickness and the lowest yield strength are considered for determining the product $P_F$.

Such a yield strength of the front part 14 can be obtained with a press hardened steel part having a high tensile strength, for example a tensile strength greater than 1200 MPa.

The composition of such steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the press hardened part is higher than 1800 MPa.

Such a steel has very high mechanical characteristics, which makes it suitable for forming the front part 14 of the longitudinal member 1 since said front part 14 extends under the space of the passenger compartment where the passengers are seated and participate to the underformability of this space, as will be described subsequently. The microstructure of such a steel comprises a large fraction of martensite.

The wall thickness $t_R$ of the rear part 18 is for example substantially comprised between 0.6 mm and 3 mm. The yield strength $Ys_R$ of the material of the rear part 18 is for example substantially comprised between 350 MPa and 950 MPa. The wall thickness $t_R$ and the yield strength $Ys_R$ of the rear part 18 are for example constant over the entire length of the front part measured along a longitudinal direction. In another embodiment, the wall thickness $t_R$ and the yield strength $Ys_R$ of the rear part 18 vary over the entire length of the rear part measured along a longitudinal direction. In this case, the highest wall thickness and the highest yield strength are considered for determining the product $P_R$.

Such a yield strength of the rear part 18 can be obtained with a press hardened steel part having a low tensile strength, for example a tensile strength greater than 350 MPa and inferior to 800 MPa.

The composition of such steel may comprise for example, in % weight: 0.04%≤C≤0.1%, 0.3%≤Mn≤2%, Si≤0.3%, Ti≤0.08%, 0.015%≤Nb≤0.1%, Al≤0.1%, S≤0.05%, P≤0.1%, Cu, Ni, Cr, Mo, less than 0.1%, the remainder being iron and unavoidable impurities resulting from the elaboration. The microstructure of such a steel comprises a low fraction of martensite or even no martensite. In any case, the fraction of martensite in the microstructure of the front part 14 is greater than the fraction of martensite in the microstructure of the rear part 18.

The rear part 18 has for example a bending angle greater than 75°, preferably greater than 80°, which confers good ductility properties to the rear part 18. The bending angle is determined on press hardened parts of 60×60 mm² supported by two rollers, according to VDA-238 bending Standard. The bending effort is exerted by a 0.4 mm radius sharp punch. The spacing between the rollers and the punch is equal to the thickness of the tested parts, a clearance of 0.5 mm being added. The crack apparition is detected since it coincides with a load decrease in the load-displacement curve. Tests are interrupted when the load decreases more than 30 N of its maximal value. The bending angle (a) of each sample is measured after unloading and thus after specimen spring-back. Five samples along each direction (rolling direction and transverse direction) are bent so to obtain an average value $a_A$ of the bending angle.

The front part 14 and the rear part 18 can have the same wall thickness. However, according to an embodiment, the wall thickness $t_F$ of the front part 14 is greater than the wall thickness $t_R$ of the rear part 18.

According to an embodiment, the front part 14 and the rear part 18 are coated with a zinc-based coating (i.e. zinc forms the major part of the coating), or aluminum-based coating (i.e. aluminum forms the major part of the coating). The coating for example may comprise zinc, aluminum (around 3.7%) and magnesium (around 3%).

The above described longitudinal beam 1 is obtained by joining a planar front part blank made of the material of the front part 14 to a planar rear part blank made of the material of the rear part 18 to form a member blank and by hot press forming the blank into the longitudinal member.

The planar front part blank has the wall thickness of the front part 14 and is made of the material of the front part 14. The planar rear part blank has the wall thickness of the rear part 18 and is made of the rear part 18. To join the front part blank to the rear part blank, the blanks are placed side by side such that their adjacent ends are in contact together. This placing is arranged such that the front part blank and the rear part blank are not superposed, meaning that the member blank does not comprise an area having two layers, one of which being formed by the front part blank and the other being formed by the rear part blank. The adjacent ends of the front and rear part blanks are then joined together, for example by welding. More particularly, the welding is for example a laser welding step.

The shaping of the member blank into the longitudinal member is for example a hot stamping step, or hot press forming step, during which the member blank acquires a U-shaped cross section and during which the second part 24 having an elbow shape is shaped. After hot stamping, the obtained longitudinal member is such that $P_F$ is greater than $P_R$.

The obtained longitudinal member can then be galvanized by applying a zinc-based coating or an aluminum-based coating.

The hinge element 10 is then attached to the front end 6 of the longitudinal member and the attachment element 12 is then attached to the rear end 8 of the longitudinal member. The hinge element 10 is for example formed by two tabs protruding from the bottom wall 28 of the longitudinal member 1, each tab extending in the continuity of one of the branch 30. The tabs are for example provided with apertures for receiving in rotation a corresponding pin provided on the vehicle body 2. The attachment element 12 is formed by any means adapted to cooperate with a corresponding locking element provided on the vehicle body 2 in a non-permanent manner. According to the embodiment shown in the figures, the attachment element 12 is for example formed by a plate carrying parallel rings 31 defining a longitudinal housing arranged to receive a corresponding locking element in the form of shaft provided on the vehicle body, as shown on FIG. 2. Alternatively, the hinge element 10 and/or the attachment element 12 can be made integral with the longitudinal member 1 and be obtained during the shaping step of the member blank.

The above-described longitudinal member is part of a floor structure of the vehicle compartment and is for example attached by the free end of the branches 30 to a floor panel arranged to close the U-shaped cross-section of the longitudinal member. Consequently, the longitudinal member 1 extends under the floor structure. According to an embodiment, the floor structure comprises two longitudinal members 1 attached on either lateral sides of the floor panel. This means that the floor structure comprises two parallel longitudinal members extending along the left and right sides of the vehicle compartment under the floor panel.

The front part 14 of the longitudinal member 1 extends under a front space 32 of the vehicle compartment 4 where the seats for the driver and passengers are located while the rear part 18 of the longitudinal member 1 extends under a rear space 34 of the vehicle compartment 4, where a storage space is provided. According to the embodiment shown in the figures, the rear part 18 also extends over the motor compartment 36 (shown in doted lines in FIGS. 2 to 4) attached to the vehicle body 2. The second part 24 of the front part 14 is arranged to allow varying the height of the longitudinal beam 1 relative to the vehicle body 2 and the motor compartment 36 such that the motor compartment 36 can be housed under the rear space 34 of the vehicle compartment 4, as shown in FIG. 2.

As explained previously, the longitudinal member 1 is attached by the hinge element 10 and by the attachment element 12 to the vehicle body 2. Such a vehicle body 2 is arranged to carry, in addition to the vehicle compartment, the wheels of the vehicle, the motor compartment 36, and a lorry trailer, for example via means for attaching the lorry trailer to the vehicle body. The vehicle body 2 is formed by a metallic chassis comprising the necessary means for attaching the above elements. The metallic chassis is for example made of steel having wall thicknesses in the range of 8 mm to 15 mm. Consequently, the vehicle body 2 has a high tensile strength adapted to resist heavy impacts without deformation of metallic chassis.

The vehicle body 2 comprises at least one complementary hinge element 38 arranged to cooperate with the hinge element 10 of the longitudinal member 1 such that the longitudinal member is hinged by its front end 6 to the vehicle body 2. The complementary hinge element 38 is for example formed by pins inserted in rotation in corresponding apertures of the tabs forming the hinge element 10 of the longitudinal member 1. The rotation axis extends transversally, i.e. along a perpendicular direction to the longitudinal direction. When two longitudinal members 1 are provided on the vehicle compartment, the vehicle body 2 comprises two complementary hinge elements 38 each cooperating with one hinge element 10.

Consequently, the hinge element 10 and the complementary hinge element 38 form a hinge 39 articulating the front end of the longitudinal member 1 to a front end of the vehicle body 2 such that the vehicle compartment 4 is hinged at its front to the vehicle body 2 by the two longitudinal members 1 between a normal use position, shown in FIG. 2, and a tilted position shown in FIG. 3. Such a tilting of the vehicle compartment 4 is conventional in heavy goods vehicle to give access to the motor compartment 36 for maintenance or repair operations since the motor compartment 36 extends under the rear space 34 of the vehicle compartment 4 as explained previously.

The hinge 39 formed by the hinge element 10 and the complementary hinge element 38 is arranged to break when an external load equal or greater than a predetermined load is applied in the longitudinal direction to the front end 6 of the longitudinal member 1. The predetermined force is force example substantially equal to 80 kN and corresponds to the minimal external load applied to the longitudinal member in the longitudinal direction in case of a front impact above which an energy absorption of part of the energy of this impact is needed.

The vehicle body 2 further comprises at least one locking element 40 arranged to cooperate with the attachment element 12 of the longitudinal member 1 such that the longitudinal member is attached by its rear end 8 to the vehicle body 2 in a non-permanent manner. The locking element 40 is formed by any means adapted to cooperate with the attachment element 12 for attaching the longitudinal member 1 by its rear end 8 in a locked position such that the rear end 8 of the longitudinal member 1 does not move relative to the vehicle body 2 when the locking element 40 is in the locked position such that the vehicle compartment cannot move to its tilted position. According to the embodiment shown in FIGS. 2 to 4, the locking element 40 is for example in the form of a shaft introduced in the rings 31 forming the attachment element 12.

The locking element 40 is further movable in an unlocked position, wherein the attachment element 12 does not cooperate with the locking element 40 such that the vehicle compartment can move to its tilted position when the locking element 40 is in the unlocked position. According to a variant, it is the attachment element 12 that is movable between the unlocked and locked positions. The locking element 40 is for example movable in translation in a longitudinal direction in the unlocked position such that the shaft can be retrieved from the rings 31, as shown in FIG. 3. When two longitudinal members 1 are provided on the vehicle compartment, the vehicle body 2 comprises two locking attachments 40 each cooperating with one attachment element 12.

The attachment element 12 and the locking element 40 form together a locking attachment connecting the rear end of the longitudinal member 1 to the vehicle body 2. Such a locking attachment is also conventional in heavy goods vehicle and allows preventing the vehicle compartment to move in the tilted position in normal use of the vehicle, for example in case of an emergency breaking or in case of an impact.

To this end, the locking attachment formed by the attachment element 12 and the locking element 10 is arranged to resist to the external load applied on the longitudinal member 1 in the longitudinal direction in case of a front impact. By resist, it is meant that the locking attachment does not break in case of an impact and that the immovable connection provided by the locking attachment remains after the impact in the locked position of the locking attachment. The locking attachment is for example able to resist to an external load greater than 80 kN and up to a force of 140 kN.

The vehicle body 2 can also comprise means for moving the vehicle compartment 4 between the normal use position and the tilted position when the locking attachment is in the unlocked position. Such means are for example formed by one or more piston devices arranged between the vehicle body 2 and the vehicle compartment 4.

The behavior of the longitudinal member in case of a front impact against the heavy goods vehicle structure described above will now be described.

In case a front impact, for example when the heavy goods vehicle hits a wall or another vehicle, the impact occurs on the front end of the heavy goods vehicle, and among others, on the front end 6 of the longitudinal member 1.

When the external load applied to the longitudinal member due to the impact is equal to or exceeds the predetermined load for which energy absorption is required, the hinge 39 breaks while the locking attachment remains, as shown in FIG. 4. Consequently, the longitudinal member 1 becomes a deformable structure able to be deformed between its front end 6 and its rear end 8, which remains attached to the vehicle body 2.

Since the front part 14 forms a substantially undeformable structure, the energy of the impact is transmitted to the rear part 18 of the longitudinal member 1 without deforming the front part 14. In particular, when the front part 14 comprises a second part 24 having an elbow shape, the second part 24 is not deformed and does not bend the rear part 18 out of its second longitudinal axis B. As seen in FIG. 4, since the longitudinal member is not deformed during the impact, the front space 32 remains intact during the impact and the driver and passengers are protected.

The energy transmitted by the front part 14 to the rear part 18 of the longitudinal member 1 causes the rear part 18 to deform along its second longitudinal axis B since the rear part 18 forms a ductile portion of the longitudinal member 1. The deformation of the rear part is more particularly a buckling of the rear part 18 along the second longitudinal axis B. The deformation causes the rear part 18 to be crushed, or buckled and form folds 42 along its longitudinal axis. The deformation is maintained along the second longitudinal axis B thanks to the end of the second part 24 of the front part 14 which is formed by the intermediate part 16 and which is also located on the second longitudinal axis B. The folds 42 allow absorption of part of the energy of the impact to reduce the consequences of the impact on the vehicle compartment. The deformation of the rear part 18 of the longitudinal member causes a deformation of the walls of the vehicle compartment 2 around the rear space 34 of the vehicle compartment, as shown by the folds 44 of FIG. 4. Consequently, the walls around the rear space 34 also participate in the energy absorption.

The deformation of the vehicle compartment in the rear space 34 is not dangerous for the occupants of the vehicle compartment since the rear space 34 is not intended to receive these passengers.

The longitudinal member 1 according to the invention allows protecting the vehicle compartment 2 in the space where the occupants are seated while absorbing energy in the unoccupied space by placing the ductile part of the longitudinal member away from the point of impact since said point of impact is located directly in front of the space where the occupants are seated in a heavy goods vehicle.

The longitudinal member is particularly suited to respond to the requirements of Test A (or Front Impact Test) of the ECE (Economic Commission for Europe) regulation ECE-R29/03.

What is claimed is:

1. A longitudinal member for a heavy goods vehicle structure, the longitudinal member comprising:
    a front end, for being oriented towards a front of the heavy goods vehicle structure, the front end having a hinge element for attaching the longitudinal member in an articulated manner to a heavy goods vehicle body;
    a rear end, for being oriented towards a rear of the heavy goods vehicle structure, the rear end having an attachment element for attaching the longitudinal member in a non-permanent manner to the heavy goods vehicle body;
    a front part extending from the front end to an intermediate area of the longitudinal member;
    a rear part extending from the intermediate area to the rear end of the longitudinal member; and
    a product of a wall thickness of the front part by a yield strength of a material of the front part is greater than a product of a wall thickness of the rear part by a yield strength of a material of the rear part.

2. The longitudinal member according to claim 1, wherein the wall thickness of the front part is from 0.6 mm to 3 mm and the yield strength of the material of the front part is from 960 MPa to 1550 MPa.

3. The longitudinal member according to claim 1, wherein the wall thickness of the rear part is from 0.6 mm to 3 mm and the yield strength of the material of the rear part is from 350 MPa to 950 MPa.

4. The longitudinal member according to claim 1, wherein the wall thickness of the front part is greater than the wall thickness of the rear part.

5. The longitudinal member according to claim 1, wherein the longitudinal member is a press hardened member.

6. The longitudinal member according to claim 1, wherein the front part is made of a press hardened steel comprising in % weight:
0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration; or
0.20%≤C≤0.25%, 1.1%≤Mn≤1.4%, 0.15%≤Si≤0.35%, Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration; or
0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, a remainder being iron and unavoidable impurities resulting from elaboration.

7. The longitudinal member according to claim 1, wherein the rear part is made of a press hardened steel comprising in % weight: 0.04%≤C≤0.1%, 0.3%≤Mn≤2%, Si≤0.3%, Ti≤0.08%, 0.015%≤Nb≤0.1%, Al≤0.1%, S≤0.05%, P≤0.1%, Cu, Ni, Cr, Mo of less than 0.1%, a remainder being iron and unavoidable impurities resulting from elaboration.

8. The longitudinal member according to claim 7, wherein the rear part has a bending angle greater than 75°.

9. The longitudinal member according to claim 5, wherein a fraction of martensite in a microstructure of the front part is greater than a fraction of martensite in a microstructure of the rear part.

10. The longitudinal member according to claim 1, wherein the front part and the rear part are coated with a zinc-based coating or with an aluminum-based coating.

11. The longitudinal member according to claim 1, wherein the intermediate area extends at an end of an elbow shaped part of the first part such that the front part, outside the elbow shaped part, extends mainly along a first longitudinal axis and the rear part extends mainly along a second longitudinal axis, the first longitudinal axis and the second longitudinal axis being different and substantially parallel to each other.

12. The longitudinal member according to claim 1, wherein the longitudinal member is configured to extend under a vehicle compartment floor structure of the heavy goods vehicle.

13. A heavy goods vehicle structure comprising:
a heavy goods vehicle body; and
a heavy goods vehicle compartment attached to the heavy goods vehicle body by at least one longitudinal member according to claim 1;
the hinge element of the front end of the longitudinal member being attached to a complementary hinge element of the vehicle body to form a hinge connecting the vehicle compartment to the vehicle body in a hinged manner;
the attachment element of the rear end of the longitudinal member being attached to a locking element of the vehicle body to form a locking attachment connecting the vehicle compartment to the vehicle body in a non-permanent manner.

14. The heavy goods vehicle structure according to claim 13, wherein the hinge is arranged to break in case of an impact applied in a substantially longitudinal direction against the front end of the longitudinal member under an external load greater than 80 kN, while the locking attachment is arranged to resist to the impact when the attachment element is attached to the locking element such that the rear part of the longitudinal member can be crushed to absorb energy in case of said impact.

15. The heavy goods vehicle structure according to claim 13, wherein the longitudinal member extends under a vehicle compartment floor structure of the heavy goods vehicle structure.

16. The heavy goods vehicle structure according to claim 15, wherein the vehicle compartment is attached to the vehicle body by at least two longitudinal members extending on either sides of the vehicle compartment floor structure.

17. A method for producing a longitudinal member according to claim 1, comprising the steps of:
providing a front part blank and a rear part blank,
joining the front part blank to the rear part blank to obtain a member blank; and
hot press forming the member blank into a shape of the longitudinal member, the longitudinal member includes the front part and the rear part, such that the product of the wall thickness of the front part by the yield strength of the material of the front part is greater than the product of the wall thickness of the rear part by the yield strength of the material of the rear part.

18. The method according to claim 17, wherein the member blank is hot press formed into the shape having a U-shaped cross-section.

19. The method according claim 18, wherein the member blank is shaped to include an elbow shaped part.

20. The method according to claim 17, wherein the front part blank is joined to the rear part blank by welding without superposing the front part blank and the rear part blank.

21. The method according to claim 20, wherein the welding is laser welding.

22. The method according to claim 17, further comprising:
attaching the hinge element to the front end of the longitudinal member and a step of attaching the attachment element to the rear end of the longitudinal member.

* * * * *